United States Patent
Nakanishi

(10) Patent No.: US 8,552,967 B2
(45) Date of Patent: Oct. 8, 2013

(54) DISPLAY DEVICE, DISPLAY CONTROL METHOD, AND ELECTRONIC APPARATUS

(75) Inventor: Takayuki Nakanishi, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 797 days.

(21) Appl. No.: 12/522,512

(22) PCT Filed: Oct. 16, 2008

(86) PCT No.: PCT/JP2008/068721
§ 371 (c)(1),
(2), (4) Date: Jul. 8, 2009

(87) PCT Pub. No.: WO2009/060700
PCT Pub. Date: May 14, 2009

(65) Prior Publication Data
US 2010/0020009 A1    Jan. 28, 2010

(30) Foreign Application Priority Data
Nov. 9, 2007  (JP) ................. 2007-291468

(51) Int. Cl.
*G09G 3/36* (2006.01)
(52) U.S. Cl.
USPC .............................. 345/102; 345/207; 345/87
(58) Field of Classification Search
USPC .................. 345/102–103, 87, 207
See application file for complete search history.

(56) References Cited

U.S. PATENT DOCUMENTS

| 4,841,349 A | 6/1989 | Nakano |
| 6,795,049 B2 * | 9/2004 | Toyoshima et al. ............. 345/93 |

(Continued)

FOREIGN PATENT DOCUMENTS

| JP | 63-144666 | 6/1988 |
| JP | 06-245150 | 9/1994 |

(Continued)

OTHER PUBLICATIONS

English translation of Japanese Patent Laid-open No. 2006-106294.*

(Continued)

*Primary Examiner* — Duc Dinh
(74) *Attorney, Agent, or Firm* — K&L Gates LLP

(57) ABSTRACT

A display device is provided including a photosensor PS that detects the ambient light amount of a display area, a comparator that compares the output of the photosensor PS with a predetermined reference value, and a backlight controller that controls the amount of light supplied to the display area depending on a comparison result by the comparator, a switch SW for controlling application of a precharge potential is connected to a metal that exists near the light-receiving part of the photosensor PS with the intermediary of an insulating film. The embodiment apparently decreases the parasitic capacitance of the detection element to thereby suppress the influence of the parasitic capacitance of the detection element itself at the time of light amount detection.

6 Claims, 14 Drawing Sheets

(56) References Cited

U.S. PATENT DOCUMENTS

| | | | |
|---|---|---|---|
| 2006/0022921 A1* | 2/2006 | Miyake et al. | 345/87 |
| 2007/0046619 A1 | 3/2007 | Sano et al. | |
| 2007/0063957 A1 | 3/2007 | Awakura et al. | |
| 2007/0188439 A1 | 8/2007 | Kimura et al. | |
| 2007/0229452 A1* | 10/2007 | Sano et al. | 345/102 |
| 2007/0268241 A1* | 11/2007 | Nitta et al. | 345/102 |

FOREIGN PATENT DOCUMENTS

| | | |
|---|---|---|
| JP | 2000-101928 | 4/2000 |
| JP | 2003-046715 | 2/2003 |
| JP | 2006-106294 | 4/2006 |
| JP | 2007-086147 | 4/2007 |
| JP | 2007-114260 | 5/2007 |
| JP | 2007-114315 | 5/2007 |

OTHER PUBLICATIONS

European Search Report for corresponding EP 08 84 8069 dated Apr. 20, 2011.
Supplementary European Search Report for corresponding EP 08 84 8069 dated Apr. 11, 2011.
International Search Report dated Nov. 11, 2008, for corresponding Patent Application PCT/JP2008/068721.
Japanese Office Action issued Aug. 14, 2012 for corresponding Japanese Appln. No. 2007-291468.

* cited by examiner

DISPLAY DEVICE, DISPLAY CONTROL METHOD, AND ELECTRONIC APPARATUS

CROSS REFERENCE TO RELATED APPLICATIONS

The present application is a National Stage of International Application No. PCT/JP2008/068721 filed on Oct. 16, 2008 and which claims priority to Japanese Patent Application No. 2007-291468 filed on Nov. 9, 2007, the entire contents of which are being incorporated herein by reference.

BACKGROUND

The present application relates to a display device that displays predetermined video, a display control method for controlling the display device, and an electronic apparatus employing a display device.

Previously, for measurement of light illuminance by a photosensor formed in a TFT panel as a liquid crystal display device (e.g. refer to Japanese Patent Laid-open No. 2006-106294), there is a method in which a comparator is connected to the sensor output as shown in FIG. 16 and electric charges (including dark current leakage) generated due to light reception are accumulated in capacitance to thereby measure the time to attainment of a reference voltage.

FIG. 17 is a schematic diagram showing the structure of the photosensor. The photosensor has a structure in which a light-receiving part composed of poly-silicon is opposed to a metal with the intermediary of an insulating film, and outputs charges depending on the amount of light captured by the light-receiving part.

However, in readout of the light amount by such a structure, because charges are accumulated in capacitance, high parasitic capacitance of the photosensor element itself causes a problem that the time of the charge accumulation in capacitance is extended. Specifically, in a photosensor structure like that shown in FIG. 17, the parasitic capacitance between the light-receiving part and the metal provided with the intermediary of the insulating film is high and therefore the above-described charge accumulation time is extended, which precludes rapid light amount detection.

SUMMARY

According to the embodiments, in a display device including a detection element that detects the ambient light amount of a display area, a comparator that compares an output of the detection element with a predetermined reference value, and a control means that controls the amount of light supplied to the display area depending on a comparison result by the comparator, a switch for controlling application of a precharge potential is connected to a metal that exists near a light-receiving part of the detection element with the intermediary of an insulating film.

In this embodiment, the switch for controlling application of the precharge potential is provided for the metal that exists near the light-receiving part of the detection element with the intermediary of the insulating film. Thus, when the precharge potential is applied to the metal opposed to the light-receiving part of the detection element by this switch, charges are accumulated in parasitic capacitance between the light-receiving part and the metal by the precharge potential, so that the parasitic capacitance can be apparently decreased.

Examples of the switch that is connected to the metal and controls application of the precharge potential to the metal include an analog switch and an element with high resistance.

Furthermore, according to the embodiment, in a display control method of detecting the ambient light amount of a display area by a detection element and controlling the amount of light supplied to the display area based on a result of comparison between a detection value and a predetermined reference value, a precharge potential is applied to a metal that exists near a light-receiving part of the detection element with the intermediary of an insulating film before start of light amount detection by the detection element, and the potential of the metal is rendered a floating state in the light amount detection.

In this embodiment, the precharge potential is applied to the metal opposed to the light-receiving part before the start of the light amount detection by the detection element. Thus, charges are accumulated in parasitic capacitance between the light-receiving part and the metal by the precharge potential, so that the parasitic capacitance can be apparently decreased.

Furthermore, according to the embodiment, in an electronic apparatus including a display device provided in a case, the display device includes a detection element that detects the ambient light amount of a display area, a comparator that compares an output of the detection element with a predetermined reference value, and a control means that controls the amount of light supplied to the display area depending on a comparison result by the comparator. In addition, a switch for controlling application of a precharge potential is connected to a metal that exists near a light-receiving part of the detection element with the intermediary of an insulating film.

In this embodiment, the switch for controlling application of the precharge potential is provided for the metal that exists near the light-receiving part of the detection element with the intermediary of the insulating film. Thus, when the precharge potential is applied to the metal opposed to the light-receiving part of the detection element by this switch, charges are accumulated in parasitic capacitance between the light-receiving part and the metal by the precharge potential, so that the parasitic capacitance can be apparently decreased.

According to the present embodiment, because the parasitic capacitance of the detection element can be apparently decreased, the influence of the parasitic capacitance of the detection element itself can be suppressed at the time of the light amount detection, and the charge accumulation time can be shortened to allow rapid light amount detection.

Additional features and advantages are described herein, and will be apparent from, the following Detailed Description and the figures.

DETAILED DESCRIPTION

An embodiment will be described below based on the drawings.

<Outline of Display Device>

Figure 1:
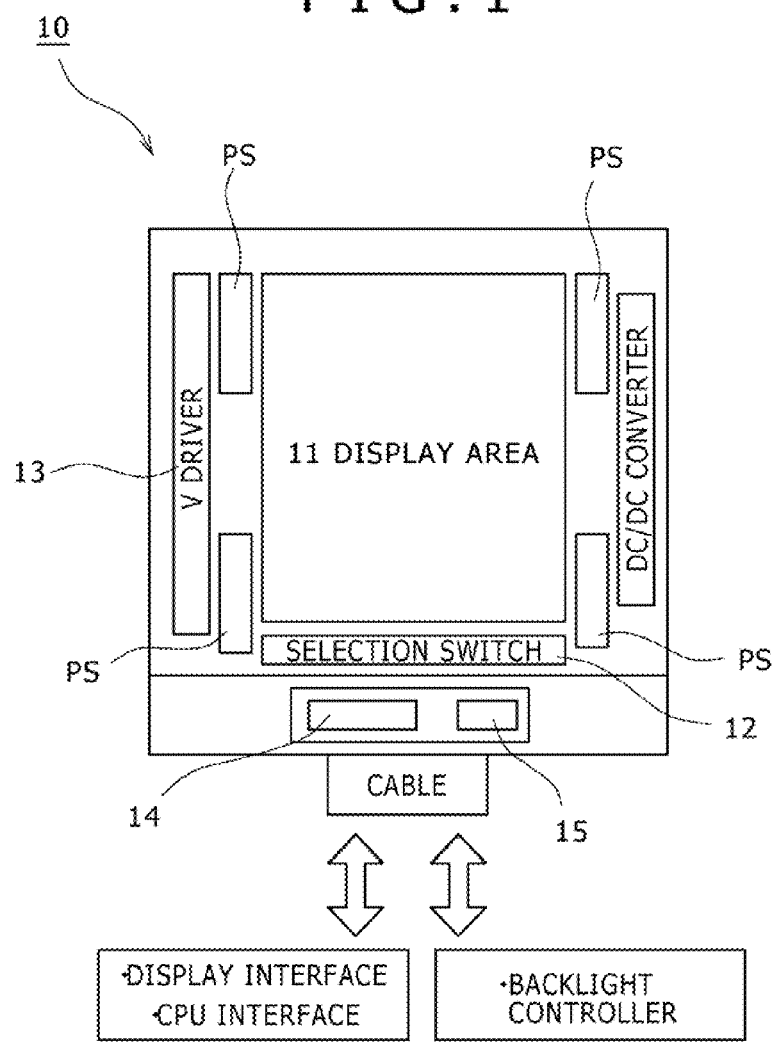
FIG. 1 is a schematic configuration diagram of a display device according to an embodiment.

FIG. 1 is a schematic configuration diagram of a display device according to the embodiment. Specifically, a display panel 10 as the display device of the embodiment includes a display area (sensor area) 11, a selection switch 12 that carries out scanning along the H (horizontal) direction for displaying, a V driver 13 that carries out scanning along the V (vertical) direction for displaying, a display driver 14, a sensor driver 15, and plural photosensors PS.

The display area (sensor area) 11 modulates light from a backlight, which is not shown in the drawing, and outputs display light. The plural photosensors PS are disposed in the periphery of the display area 11 and are driven by the sensor driver 15. The display driver 14 and the sensor driver 15 are collected into an integrated circuit and are mounted as a chip component on the substrate.

The selection switch 12 line-sequentially drives the liquid crystal elements of the respective pixels in the display area 11 together with the V driver 13, based on a display signal and a control clock for display driving, supplied from the display driver 14.

Around the display area 11, the plural photosensors PS are disposed. The photosensors PS are formed of a diode configuration or a transistor configuration and are formed on the same substrate as that of the drive elements formed in the display area 11 for example.

The display panel 10 is connected via a cable to external interfaces (e.g. a display interface, CPU interface) and a backlight control means and is driven based on a control signal and a video signal from these units.

Although four photosensors PS are provided corresponding to the corners of the display area 11 in the example shown in FIG. 1, it is sufficient that at least one photosensor is provided. If two photosensors are provided, one of them may detect the ambient light amount and the other may detect dark current arising when light is blocked so that the detection value corresponding to the dark current may be cancelled based on the difference between these two photosensors. In the embodiment, the control unit (backlight controller) controls the light amount of the backlight based on the detection result by this photosensor. A specific application example of this photosensor will be described below.

Figure 2:
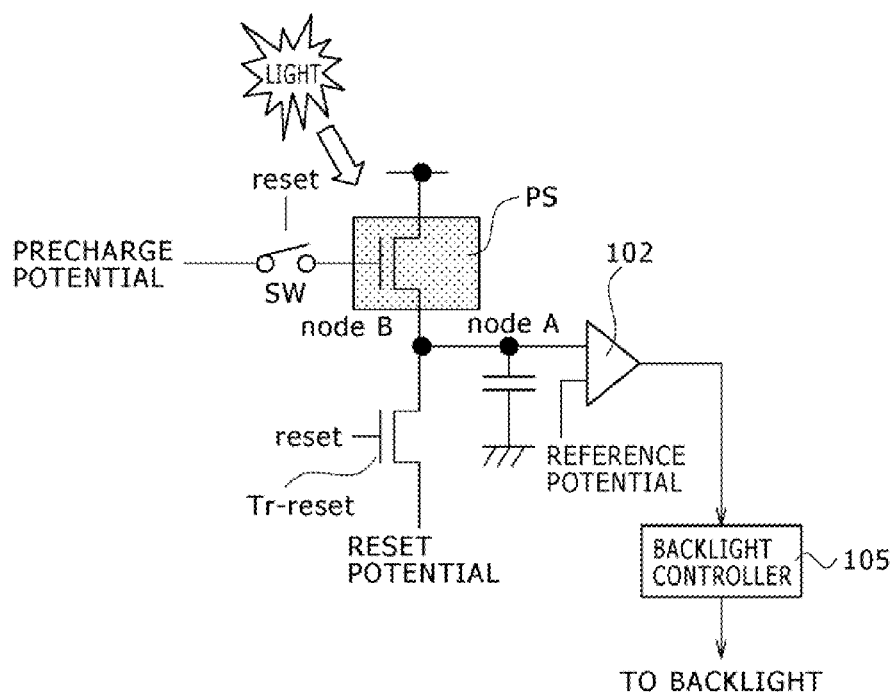
FIG. 2 is a circuit diagram for explaining major part of the display device according to the embodiment.

FIG. 2 is a circuit diagram for explaining major part of the display device according to the embodiment. Specifically, this display device includes a photosensor PS as a detection element that detects the ambient light amount of the display area, a comparator 102 that compares the output of the photosensor PS with a predetermined reference value, and a controller (backlight controller 105) that controls the amount of light supplied to the display area depending on a comparison result by the comparator 102.

Figure 12:
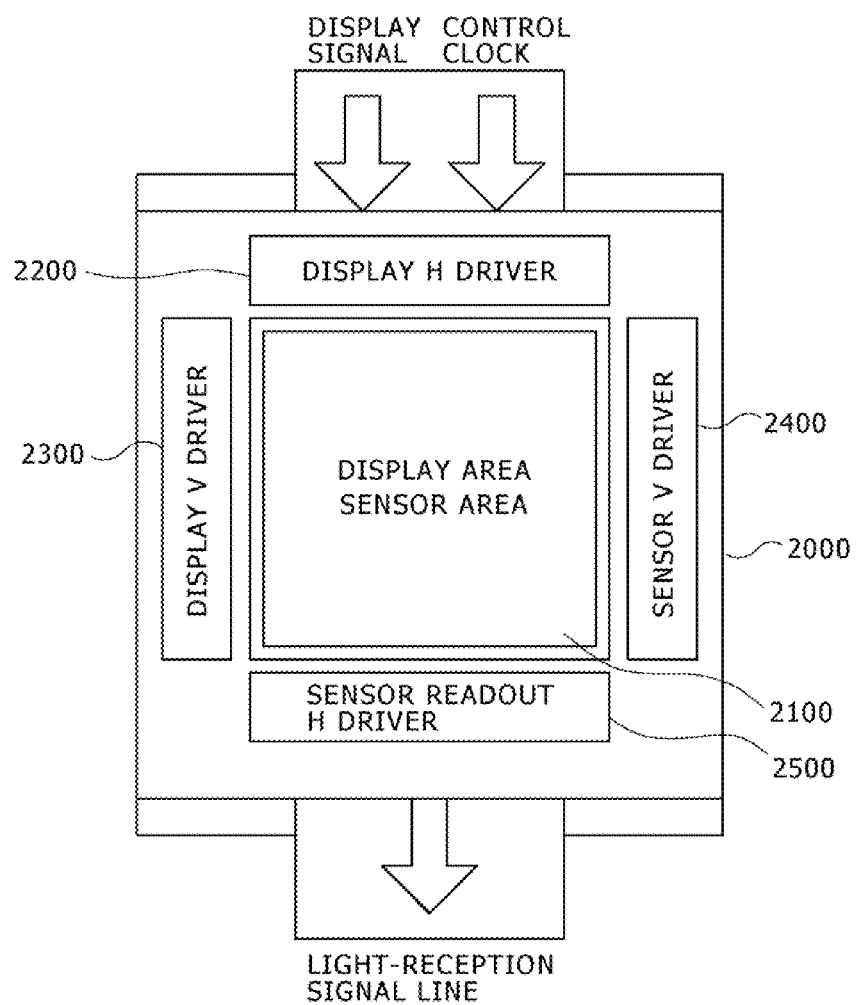
FIG. 12 is a block diagram showing a configuration example of an I/O display panel shown in FIG. 1.

Further, in particular, the photosensor PS has a structure like that shown in FIG. 12 in the embodiment. Specifically, a switch SW for controlling application of a precharge potential is connected to the metal that exists near the light-receiving part of the photosensor PS with the intermediary of an insulating film.

The switch SW connected to the metal may be an analog switch. Alternatively, it may be an element having high resistance. By turning ON (closing) this switch SW, the precharge potential is applied to the metal of the photosensor PS, so that charges are accumulated in parasitic capacitance formed between the metal and the light-receiving part. The switch SW is turned OFF (opened) in this state to thereby render the metal potential the floating state, and the light amount is detected by the light-receiving part. By this scheme, the apparent parasitic capacitance between the metal and the light-receiving part of the photosensor PS is decreased, which can shorten the charge accumulation time at the time of the light amount detection and thus allows rapid detection.

<Display Control Method by Display Device According to Embodiment: Basic Control Method>

Figure 3:
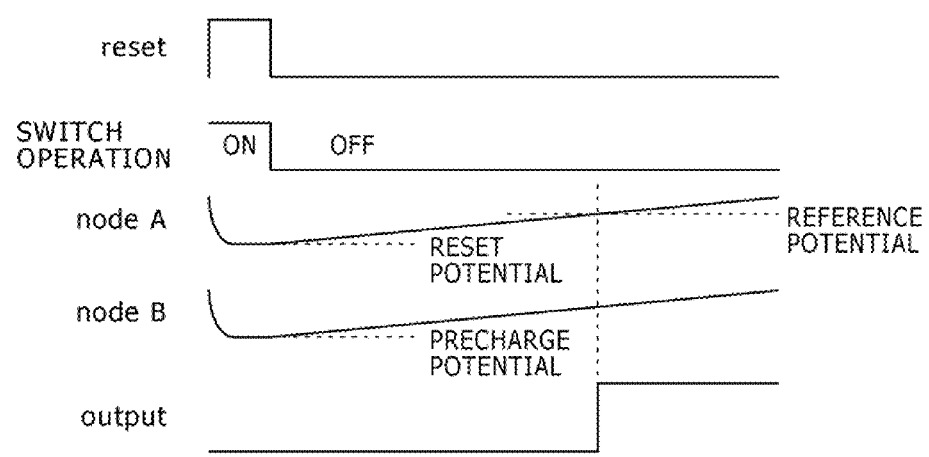
FIG. 3 is a timing chart for explaining a display control method of the display device of the embodiment.

FIG. 3 is a timing chart for explaining a display control method of the display device of the embodiment. Operation for measuring the illuminance will be described below. First, reset is carried out for the entire circuit shown in FIG. 2. In the reset, a reset transistor Tr-reset is turned ON and the switch SW connected to the metal of the photosensor PS is turned ON. By this operation, node A as the output line of the photosensor PS is fixed to a reset potential.

Furthermore, node B of a wiring connected to the metal of the photosensor ps is fixed to the precharge potential due to the turn-on of the switch SW.

This reset operation is carried out in e.g. a vertical blanking period of video displaying on the display area 11 (see FIG. 1). This can prevent the reset operation from affecting the video displaying.

As deactivation of the reset, the reset transistor Tr-reset is turned OFF and the switch is turned OFF. This reset deactivation renders the potential of node B the floating state, and thus node B keeps on holding the precharge potential accumulated in the reset.

If light is incident on the light-receiving part of the photosensor PS in this state, charges are generated depending on the light amount and accumulated in the capacitance (parasitic capacitance) of node A as the output line.

Furthermore, node A is input to the comparator 102 and compared with the reference potential. When the potential of node A surpasses the reference potential, the comparator output (output) is inverted. The light amount can be measured based on the time from the reset to the output inversion.

Consideration will be made below about the parasitic capacitance of node A, which is equivalent to the output line of the photosensor PS. At the time of the reset, high capacitance arises at node A because node A is connected to node B (=precharge potential) via the insulating film of the photosensor PS. However, when the reset is deactivated, node B follows change in node A because the potential of node B is in the floating state, although capacitance exists at node A because node B exists with the intermediary of the insulating film. Therefore, capacitance is absent from the viewpoint of node A. Thus, using this circuit can apparently decrease the parasitic capacitance of the sensor output at the time of photosensor readout.

The detection by the photosensor PS is started from the reset deactivation. As a result of the comparison by the comparator 102, the time (e.g. the number of steps) to the timing at which the detection value surpasses the predetermined reference value is counted and stored in the memory of the backlight controller 105.

Thereafter, the light amount of the backlight emitted onto the display area 11 (see FIG. 1) is controlled by the backlight controller 105 based on the detection result by the photosensor PS, stored in the memory of the backlight controller 105. For example, the light amount of the backlight is increased when the ambient light amount is larger, whereas the light amount of the backlight is decreased when the ambient light amount is smaller.

In the above-described manner, the parasitic capacitance of the output of the photosensor PS can be decreased, which can shorten the detection time and thus allows rapid control of the light amount of the backlight.

<Display Control Method by Display Device According to Embodiment: with Two Photosensors>

Figure 4:
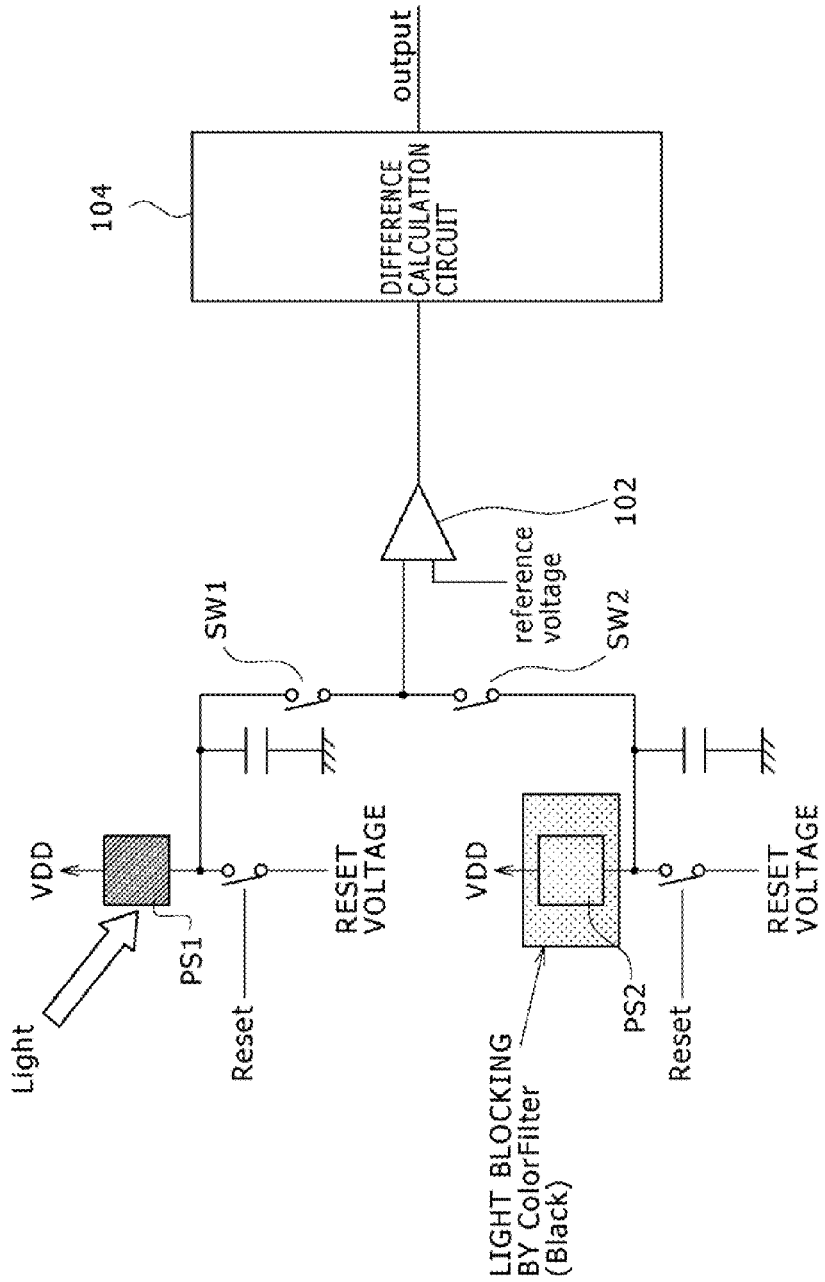
FIG. 4 is a circuit diagram for explaining a configuration for carrying out display control with use of two photosensors.

FIG. 4 is a circuit diagram for explaining a configuration for carrying out display control with use of two photosensors. Specifically, in this configuration, a first photosensor PS1 that detects the ambient light amount of the display area and a second photosensor PS2 that detects dark current arising when light is blocked are used, and comparison between the detection results by these photosensors and predetermined reference values is carried out with one comparator 102. For this purpose, switching between the first photosensor PS1 and the second photosensor PS2 is carried out, and the comparator 102 is operated in a time-division manner. For each of the photosensors PS1 and PS2, the above-described switch (not shown) for controlling application of a precharge voltage is provided.

Initially, a changeover switch SW1 of the first photosensor PS1 is turned OFF, whereas a changeover switch SW2 of the second photosensor PS2 is turned ON. In this state, reset of the second photosensor PS2 is carried out. By this reset, the switch connected to the metal of the second photosensor PS2 is turned ON, so that the connected line (node B) is fixed to the precharge potential.

Subsequently, the reset of the second photosensor PS2 is deactivated. This reset deactivation renders node B the floating state, and thus node B keeps on holding the precharge potential accumulated in the reset. Furthermore, light amount detection is started upon the reset deactivation. This detection is equivalent to measurement of dark current arising when light is blocked because a black color filter is provided for the second photosensor PS2. The detection result is sent to one input of the comparator 102. To the other input of the comparator 102, a predetermined reference value used when the second photosensor PS2 is selected is input.

Subsequently, the time (e.g. the number of steps) from the detection start to the timing at which the detection value of the second photosensor PS2 surpasses the predetermined reference value is counted and stored in the memory of the difference calculation circuit 104.

Subsequently, the changeover switch SW2 of the second photosensor PS2 is turned OFF, whereas the changeover switch SW1 of the first photosensor PS1 is turned ON. In this state, reset of the first photosensor PS1 is carried out. By this reset, the switch connected to the metal of the first photosensor PS1 is turned ON, so that the connected line (node B) is fixed to the precharge potential.

Subsequently, the reset of the first photosensor PS1 is deactivated. This reset deactivation renders node B the floating state, and thus node B keeps on holding the precharge potential accumulated in the reset. Furthermore, light amount detection is started upon the reset deactivation. The first photosensor PS1 can receive ambient light, and thus this detection is equivalent to measurement of current arising at the time of light irradiation. The detection result is sent to one input of the comparator 102. To the other input of the comparator 102, a predetermined reference value used when the first photosensor PS1 is selected is input.

Subsequently, the time (e.g. the number of steps) from the detection start to the timing at which the detection value of the first photosensor PS1 surpasses the predetermined reference value is counted and stored in the memory of the difference calculation circuit 104.

Subsequently, the detection result by the first photosensor PS1 and the detection result by the second photosensor PS2, stored in the memory of the difference calculation circuit 104, are read out, and the difference calculation circuit 104 performs operation of subtracting the detection result by the second photosensor PS2 from the detection result by the first photosensor PS1. This allows achievement of the result arising from subtraction of the component corresponding to the dark current from the detection result obtained at the time of the light irradiation. Based on this calculation result, the light amount of the backlight emitted onto the display area 11 (see FIG. 1) is controlled by the backlight control means. For example, the light amount of the backlight is increased when the light amount of ambient light is larger, whereas the light amount of the backlight is decreased when the light amount of ambient light is smaller.

In this manner, the detection results about two photosensors PS1 and PS2 are compared by using one comparator 102 and calculation is performed with use of the values. Thus, the light amount detection can be accurately carried out without suffering from the influence of variation in the characteristics of the comparator 102.

<Electronic Apparatus>

Figure 5:
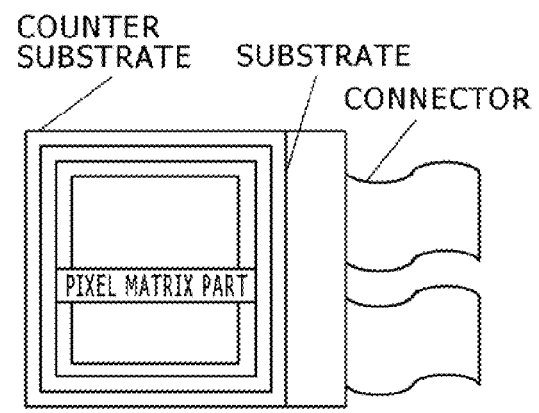
FIG. 5 is a schematic diagram showing an example of a flat module shape.

The display device according to the embodiment encompasses one having a flat module shape like that shown in FIG. 5. For example, this display module is obtained as follows. A pixel array part in which pixels each including a liquid crystal element, a thin film transistor, a thin film capacitor, a light-receiving element, and so on are integrally formed into a matrix is provided on an insulating substrate. Furthermore, an adhesive is so disposed as to surround this pixel array part (pixel matrix part), and a counter substrate composed of glass or the like is bonded to the insulating substrate. This transparent counter substrate may be provided with a color filter, protective film, light-blocking film, and so on according to need. The display module may be provided with e.g. a FPC (flexible printed circuit) as a connector for input/output of signals and so on to/from the pixel array part from/to the external.

The display device according to the above-described embodiment can be applied to a display device that is included in electronic apparatus in any field and displays an image or video based on a video signal input to the electronic apparatus or produced in the electronic apparatus. Specifically, the display device can be applied to a display device in various kinds of electronic apparatus shown in FIGS. 6 to 10, such as a digital camera, notebook personal computer, portable terminal apparatus typified by a cellular phone, and video camera. Examples of electronic apparatus to which the embodiment is applied will be described below.

Figure 6:
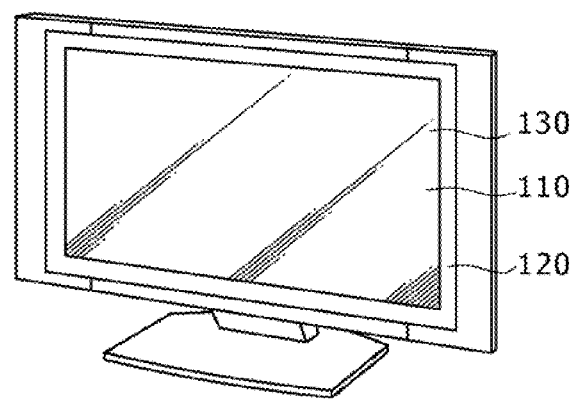
FIG. 6 is a perspective view showing a television to which the embodiment is applied.

FIG. 6 is a perspective view showing a television to which the embodiment is applied. The television according to the present application example includes a video display screen 110 composed of a front panel 120, a filter glass 130, and so on, and is fabricated by using the display device according to the embodiment as the video display screen 110.

Figure 7:
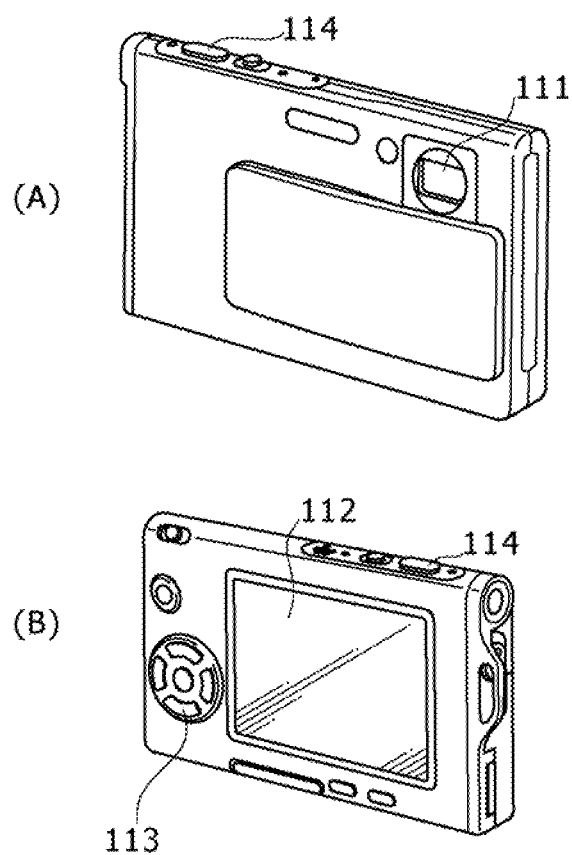
FIG. 7 is a perspective view showing a digital camera to which the embodiment is applied.

FIG. 7 is a perspective view showing a digital camera to which the embodiment is applied: (A) is a front-side perspective view and (B) is a backside perspective view. The digital camera according to the present application example includes a light emission unit 111 for flash, a display part 112, a menu switch 113, a shutter button 114, and so on, and is fabricated by using the display device according to the embodiment as the display part 112.

Figure 8:
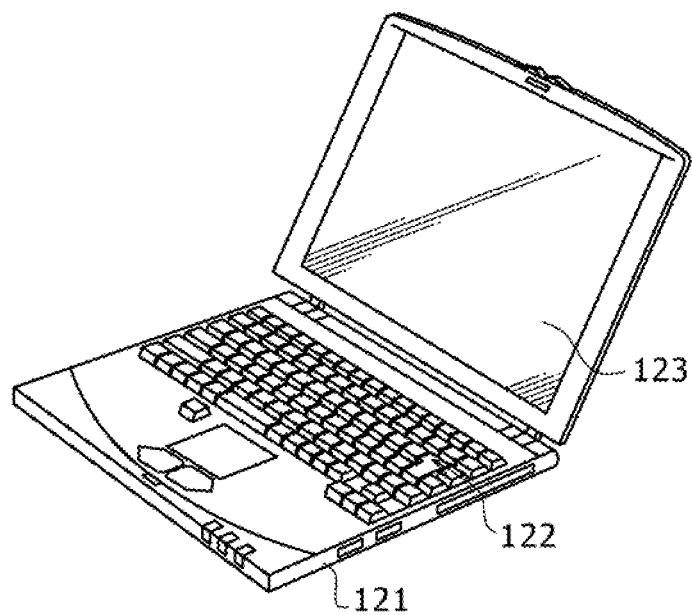
FIG. 8 is a perspective view showing a notebook personal computer to which the embodiment is applied.

FIG. 8 is a perspective view showing a notebook personal computer to which the embodiment is applied. The notebook personal computer according to the present application example includes, in a main body 121 thereof, a keyboard 122 operated in inputting of characters and so forth, a display part 123 for image displaying, and so on. This notebook personal computer is fabricated by using the display device according to the embodiment as the display part 123.

Figure 9:
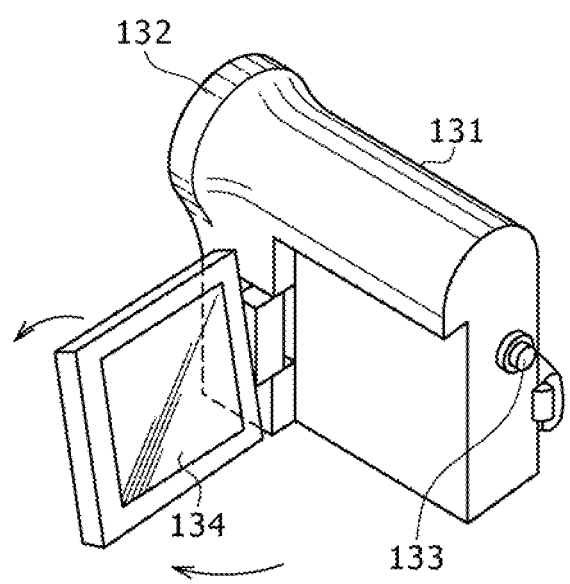
FIG. 9 is a perspective view showing a video camera to which the embodiment is applied.

FIG. 9 is a perspective view showing a video camera to which the embodiment is applied. The video camera according to the present application example includes a main body 131, a lens 132 that is disposed on the side face directed toward the front side and used to capture a subject image, a start/stop switch 133 used at the time of imaging, a display part 134, and so on. This video camera is fabricated by using the display device according to the embodiment as the display part 134.

Figure 10:
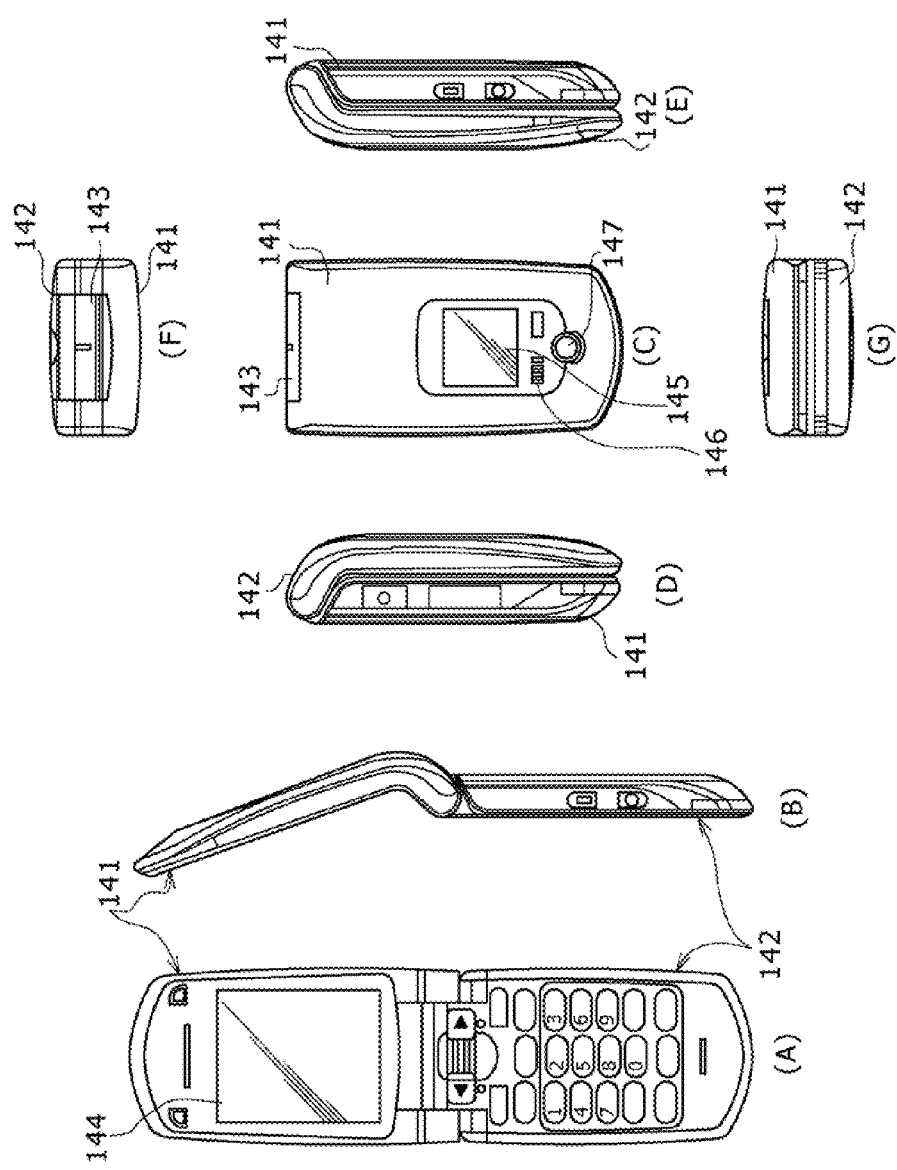
FIG. 10 is a diagram showing portable terminal apparatus to which the embodiment is applied, specifically e.g. a cellular phone.

FIG. 10 is a diagram showing portable terminal apparatus to which the embodiment is applied, specifically e.g. a cellular phone: (A) and (B) are front view and side view, respectively, of the opened state, and (C), (D), (E), (F), and (G) are front view, left-side view, right-side view, top view, and bottom view, respectively, of the closed state. The cellular phone according to the present application example includes an upper case 141, a lower case 142, a connection (hinge, in this example) 143, a display 144, a sub-display 145, a picture light 146, a camera 147, and so on. This cellular phone is fabricated by using the display device according to the embodiment as the display 144 and the sub-display 145.

<Display-and-Imaging Device>

Figure 11:
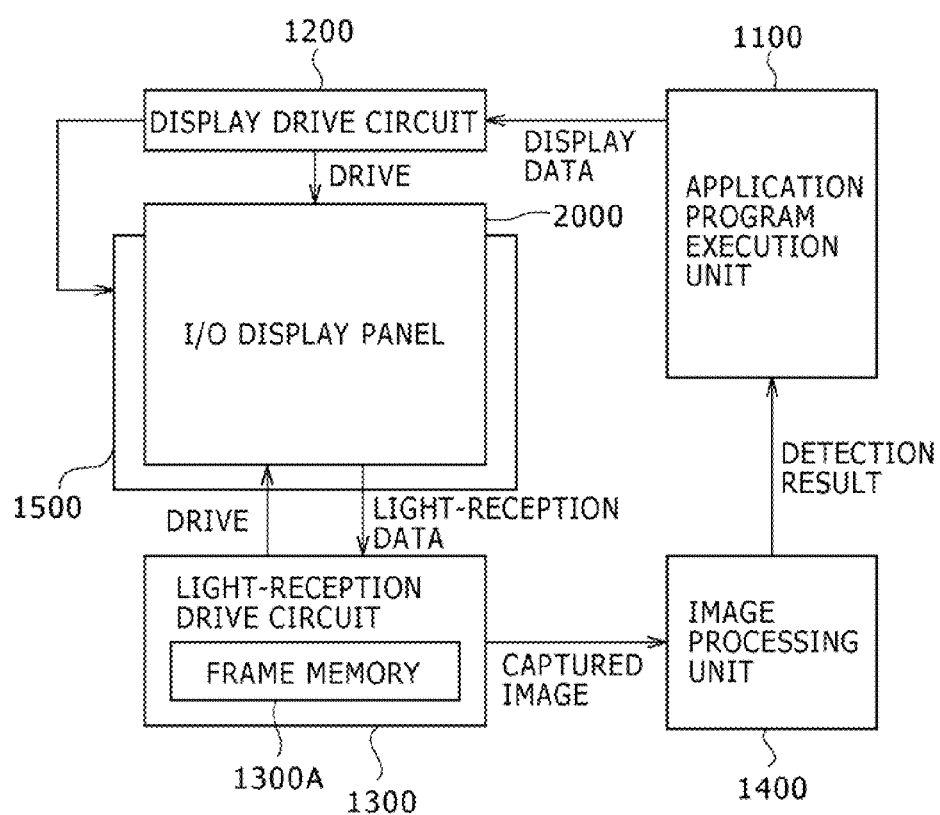
FIG. 11 is a block diagram showing the configuration of a display-and-imaging device according to the first embodiment.

The display device according to the embodiment can be applied to the following display-and-imaging device. This display-and-imaging device can be applied to the above-described various kinds of electronic apparatus. FIG. 11 shows the entire configuration of the display-and-imaging device. This display-and-imaging device includes an I/O display panel 2000, a backlight 1500, a display drive circuit 1200, a light-reception drive circuit 1300, an image processing unit 1400, and an application program execution unit 1100.

The I/O display panel 2000 is formed of a liquid crystal panel (LCD (Liquid Crystal Display)) in which plural pixels are arranged in a matrix across the entire surface. The I/O display panel 2000 has a function (display function) to display a predetermined image such as graphics and characters based on display data through line-sequential operation, and has a function (imaging function) to capture the image of an object in contact with or in proximity to the I/O display panel 2000 as described later. The backlight 1500 is obtained by arranging e.g. plural light emitting diodes and serves as the light source of the I/O display panel 2000. The backlight 1500 carries out ON/OFF operation at high speed at predetermined timings in synchronization with the operation timings of the I/O display panel 2000 as described later.

The display drive circuit 1200 drives the I/O display panel 2000 (drives line-sequential operation) for displaying of an image based on display data on the I/O display panel 2000 (for display operation).

The light-reception drive circuit 1300 drives the I/O display panel 2000 (drives line-sequential operation) for acquisition of light-reception data by the I/O display panel 2000 (for imaging of an object). The light-reception data by the respective pixels are accumulated in a frame memory 1300A e.g. on a frame-by-frame basis and are output as a captured image to the image processing unit 14.

The image processing unit 1400 executes predetermined image processing (arithmetic processing) based on the captured image output from the light-reception drive circuit 1300, and detects and acquires information on the object in contact with or in proximity to the I/O display panel 2000 (position coordinate data, data relating to the shape and the size of the object, and so forth).

The application program execution unit 1100 executes processing corresponding to predetermined application software based on the detection result by the image processing unit 1400. Examples of the processing include one for incorporating the position coordinates of the detected object into display data to thereby display the object on the I/O display panel 2000. The display data produced by the application program execution unit 1100 is supplied to the display drive circuit 1200.

A detailed configuration example of the I/O display panel 2000 will be described below with reference to FIG. 12. The I/O display panel 2000 includes a display area (sensor area) 2100, a display H driver 2200, a display V driver 2300, a sensor readout H driver 2500, and a sensor V driver 2400.

The display area (sensor area) 2100 is an area for outputting display light through modulation of light from the backlight 1500 and capturing the image of an object in contact with or in proximity to this area. In this area, liquid crystal elements as light-emitting elements (display elements) and light-receiving elements (imaging elements) to be described later are arranged in a matrix.

The display H driver 2200 line-sequentially drives the liquid crystal elements of the respective pixels in the display area 2100 together with the display V driver 2300, based on a display signal and a control clock for display driving, supplied from the display drive circuit 1200.

The sensor readout H driver 2500 line-sequentially drives the light-receiving elements of the respective pixels in the sensor area 2100 together with the sensor V driver 2400, to thereby acquire a light-reception signal.

Figure 13:
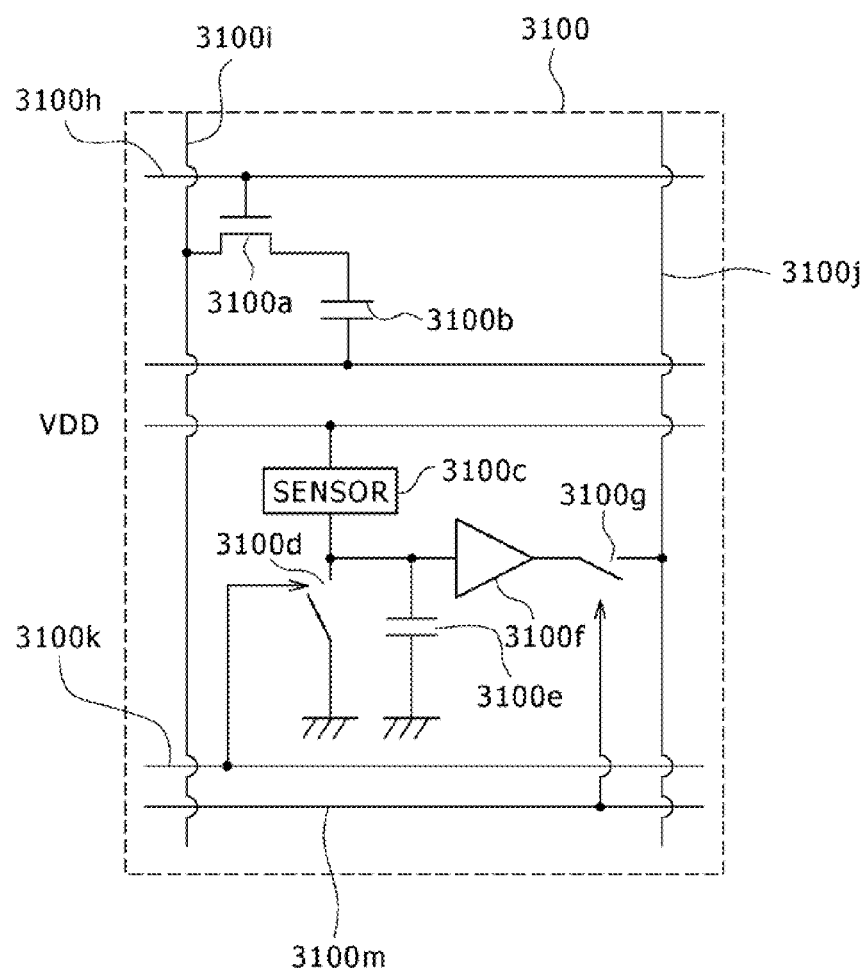
FIG. 13 is a circuit diagram showing a configuration example of each pixel.

A detailed configuration example of each pixel in the display area 2100 will be described below with reference to FIG. 13. A pixel 3100 shown in FIG. 13 includes a liquid crystal element as a display element and a light-receiving element.

Specifically, on the display element side, a switching element 3100*a* formed of a thin film transistor (TFT) or the like is disposed at the intersection of a gate electrode 3100*h* extending along the horizontal direction and a drain electrode 3100*i* extending along the vertical direction. A pixel electrode 3100*b* including a liquid crystal is disposed between the switching element 3100*a* and a counter electrode. The switching element 3100*a* carries out ON/OFF operation based on a drive signal supplied via the gate electrode 3100*h*. When the switching element 3100*a* is in the on-state, a pixel voltage is applied to the pixel electrode 3100*b* based on a display signal supplied via the drain electrode 3100*i*, so that the display state is set.

On the other hand, on the light-receiving element side adjacent to the display element, a light-reception sensor 3100c formed of e.g. a photodiode is disposed and a supply voltage VDD is provided thereto. A reset switch 3100d and a capacitor 3100e are connected to the light-reception sensor 3100c. Charges dependent on the light-reception amount are accumulated in the capacitor 3100e, and charges are reset by the reset switch 3100d. At the turn-on timing of a readout switch 3100g, the accumulated charges are supplied via a buffer amplifier 3100f to a signal output electrode 3100j and output to the external. The ON/OFF operation of the reset switch 3100d is controlled by a signal supplied from a reset electrode 3100k. The ON/OFF operation of the readout switch 3100g is controlled by a signal supplied from a readout control electrode 3100k.

Figure 14:
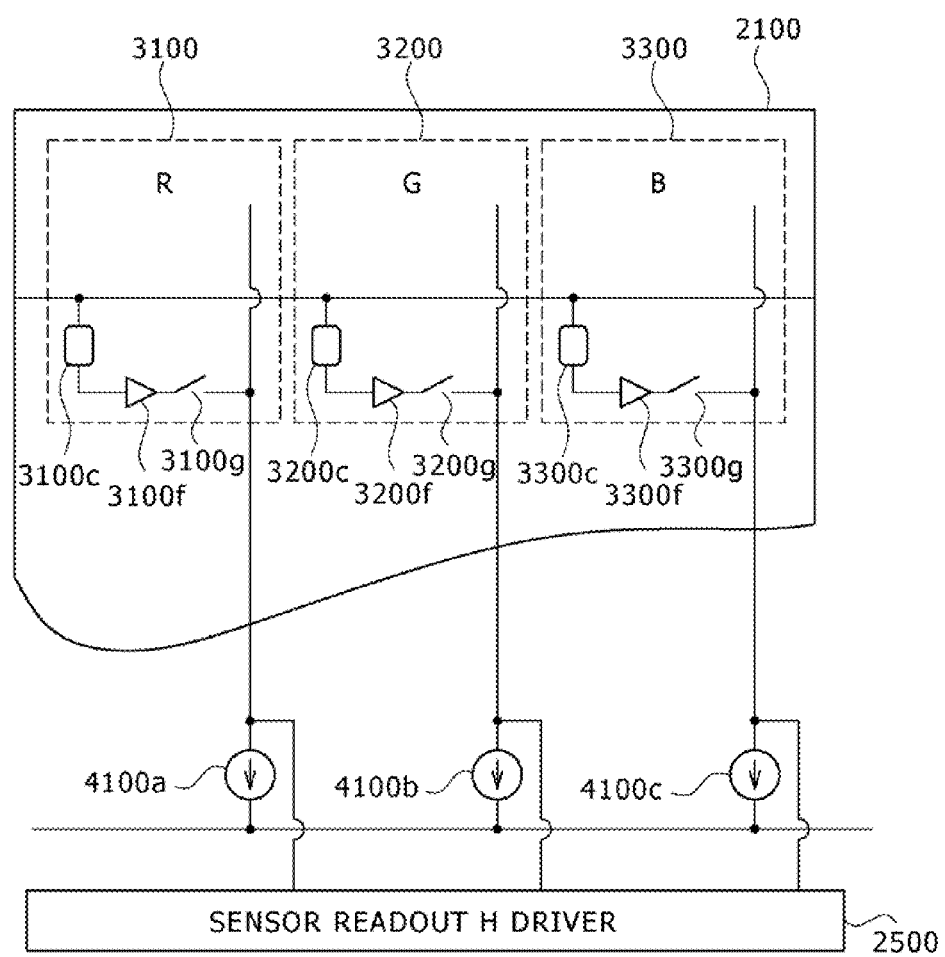
FIG. 14 is a circuit diagram for explaining the connection relationship between the respective pixels and a sensor readout H driver.

With reference to FIG. 14, the connection relationship between the respective pixels in the display area 2100 and the sensor readout H driver 2500 will be described below. In this display area 2100, a pixel 3100 for red (R), a pixel 3200 for green (G), and a pixel 3300 for blue (B) are arranged.

Charges accumulated in capacitors connected to the light-reception sensors 3100c, 3200c, and 3300c in the respective pixels are amplified by the buffer amplifiers 3100f, 3200f, and 3300f, respectively, and are supplied via signal output electrodes to the sensor readout H driver 2500 at the turn-on timings of the readout switches 3100g, 3200g, and 3300g, respectively. Constant current sources 4100a, 4100b, and 4100c are connected to the respective signal output electrodes, and thus signals dependent on the light-reception amounts are detected by the sensor readout H driver 2500 with high sensitivity.

The operation of the display-and-imaging device will be described in detail below.

Initially, the basic operation of this display-and-imaging device, i.e. display operation and object imaging operation in a pixel, will be described below.

In this display-and-imaging device, a drive signal for displaying is produced in the display drive circuit 1200 based on display data supplied from the application program execution unit 1100, and line-sequential display driving of the I/O display panel 2000 is carried out by this drive signal, so that an image is displayed. At this time, the backlight 1500 is also driven by the display drive circuit 1200, so that lighting and lighting-stop operation in synchronization with the I/O display panel 2000 is carried out.

Figure 15:
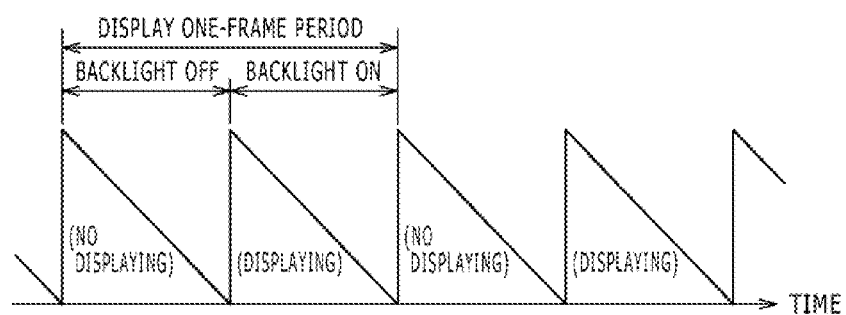
FIG. 15 is a timing diagram for explaining the relationship between the on-/off-state of a backlight and the display state.
Figure 16:
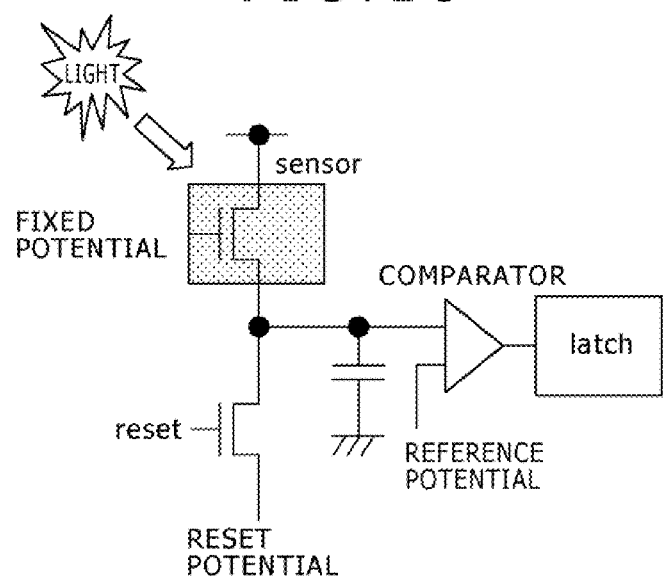
FIG. 16 is a diagram for explaining a conventional example.
Figure 17:
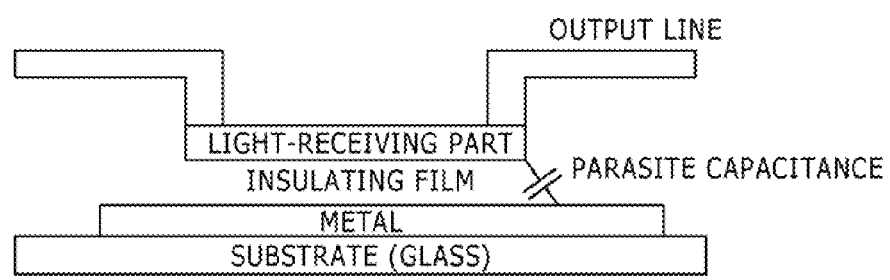
FIG. 17 is a schematic sectional view for explaining the structure of a photo sensor.

With reference to FIG. 15, the relationship between the on-/off-state of the backlight 1500 and the display state of the I/O display panel 2000 will be described below.

First, in the case of image displaying with a frame cycle of e.g. 1/60 seconds, the backlight 1500 stops lighting (is in the off-state) and thus displaying is not carried out during the former period of each frame period (for 1/120 seconds). On the other hand, during the latter period of each frame period, the backlight 1500 carries out lighting (is in the on-state) and display signals are supplied to the respective pixels, so that an image corresponding to this frame period is displayed.

As above, the former period of each frame period is a light-absent period during which display light is not output from the I/O display panel 2000. On the other hand, the latter period of each frame period is a light-present period during which display light is output from the I/O display panel 2000.

When there is an object (such as a fingertip) in contact with or in proximity to the I/O display panel 2000, the image of the object is captured by the light-receiving elements of the respective pixels in the I/O display panel 2000 through line-sequential light-reception driving by the light-reception drive circuit 1300, and light-reception signals from the respective light-receiving elements are supplied to the light-reception drive circuit 1300. The light-reception signals of the pixels corresponding to one frame are accumulated in the light-reception drive circuit 1300 and are output as a captured image to the image processing unit 14.

The image processing unit 1400 executes predetermined image processing (arithmetic processing) based on this captured image, so that information on the object in contact with or in proximity to the I/O display panel 2000 (position coordinate data, data relating to the shape and the size of the object, and so forth) is detected.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A display device comprising:
 a detection element that detects an amount of ambient light of a display area;
 a comparator that compares an output of the detection element with a first predetermined reference value; and
 a controller configured to control an amount of light supplied to the display area depending on a comparison result by the comparator, wherein
 a switch connected to a first metal that exists near a light-receiving part of the detection element outside the display area with an intermediary of an insulating film, the switch controlling an application of a precharge potential to the metal to form a parasitic capacitance between the first metal and the light-receiving part of the detection element, and to render a potential of the first metal a floating state; and
 a dark current detection element including a black color filter and configured to detect a dark current; and
 a second switch connected to a second metal that exists near the dark current detection element,
 wherein the comparator compares an output of the dark current detection element with a second predetermined reference value.

2. A display control method comprising:
 detecting an amount of ambient light of a display area by detection means and controlling an amount of light supplied to the display area based on a result of comparison between a detection value and a first predetermined reference value; and
 controlling an application of a precharge potential to a first metal to form a parasitic capacitance between the first metal and a light-receiving part of the detection means outside the display area, and to render a potential of the first metal a floating state,
 wherein the first metal exists near the light-receiving part of the detection element with an intermediary of an insulating film, wherein a dark current detection element includes a black color filter and is configured to detect a dark current, wherein a second switch is connected to a second metal that exists near the dark current detection element, and wherein a comparator is configured to compare an output of the dark current detection element with a second predetermined reference value.

3. An electronic apparatus comprising a display device provided in a case, the display device including:
 a detection element that detects an amount of ambient light of a display area;

a comparator that compares an output of the detection element with a first predetermined reference value; and a controller configured to control an amount of light supplied to the display area depending on a comparison result by the comparator, wherein a switch connected to a first metal that exists near a light-receiving part of the detection element outside the display area with an intermediary of an insulating film, the switch controlling an application of a precharge potential to the first metal to form a parasitic capacitance between the first metal and the light-receiving part of the detection element, and to render a potential of the first metal a floating state; and a dark current detection element including a black color filter and configured to detect a dark current; and a second switch connected to a second metal that exists near the dark current detection element, wherein the comparator compares an output of the dark current detection element with a second predetermined reference value.

4. A display device according to claim 1, wherein before a start of light amount detection by the detection element, the switch is closed and applies the precharge potential to the metal to form the parasitic capacitance between the metal and the light-receiving part of the detection element, and at the start of light amount detection by the detection element, the switch is open rendering the potential of the metal the floating state.

5. A display device according to claim 1, wherein a reset operation is carried out in a vertical blanking period of video displaying on the display area.

6. A display device according to claim 1, wherein the switch is electrically connected to the controller.

* * * * *